United States Patent [19]

Stewart

[11] Patent Number: 5,110,145
[45] Date of Patent: May 5, 1992

[54] POWER TOOL ADAPTOR

[76] Inventor: Patrick A. Stewart, 3429 Gibson SE., Apt. A, Albuquerque, N. Mex. 87106

[21] Appl. No.: 719,824

[22] Filed: Jun. 24, 1991

[51] Int. Cl.⁵ .............................................. B23B 51/12
[52] U.S. Cl. ................................... 279/24; 408/239 A
[58] Field of Search .............................. 279/1 A, 1 R; 408/239 R, 239 A, 238, 241 R

[56] References Cited

U.S. PATENT DOCUMENTS

| | | | |
|---|---|---|---|
| 2,465,309 | 3/1949 | Happe et al. | 279/1 A X |
| 3,443,448 | 5/1969 | Coss | 279/102 X |
| 3,484,114 | 12/1969 | Rodin | 81/180.1 X |
| 3,973,784 | 8/1976 | Smith | 408/239 |
| 4,413,937 | 11/1983 | Gutsche | 408/239 |
| 4,824,298 | 4/1989 | Lippacher et al. | 408/240 |
| 4,944,641 | 7/1990 | Alves | 408/239 |

FOREIGN PATENT DOCUMENTS 2137912 10/1984 United Kingdom ............... 279/1 A

Primary Examiner—Steven C. Bishop
Attorney, Agent, or Firm—Donovan F. Duggan; Deborah A. Peacock

[57] ABSTRACT

A power tool adaptor for converting a screw gun to a power drill. The adaptor comprises a torque transmitting sleeve mounted for relative rotation within a grip sleeve. Safety and speed of attachment and detachment are thereby provided.

14 Claims, 2 Drawing Sheets

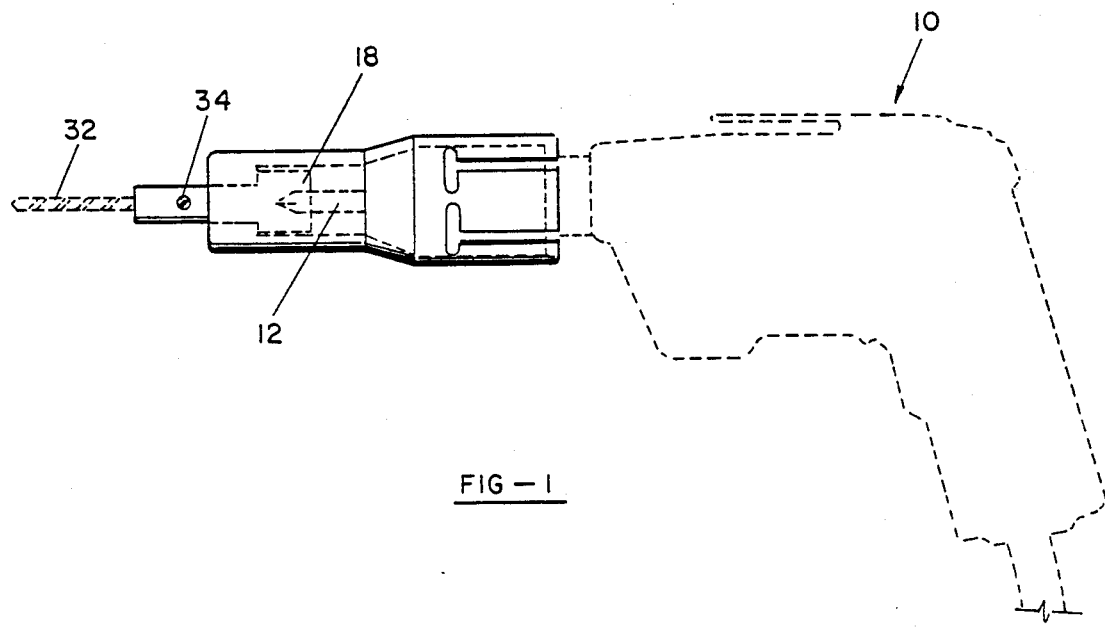
FIG — 1
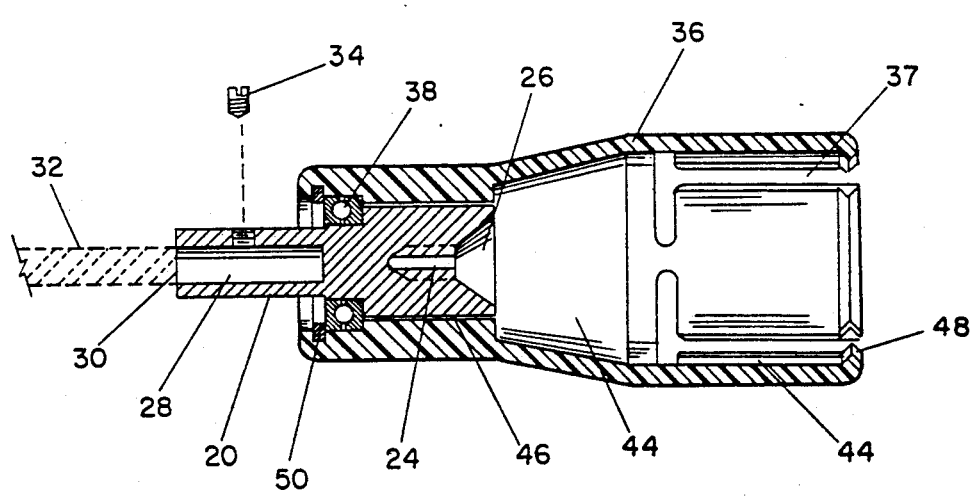
FIG — 2

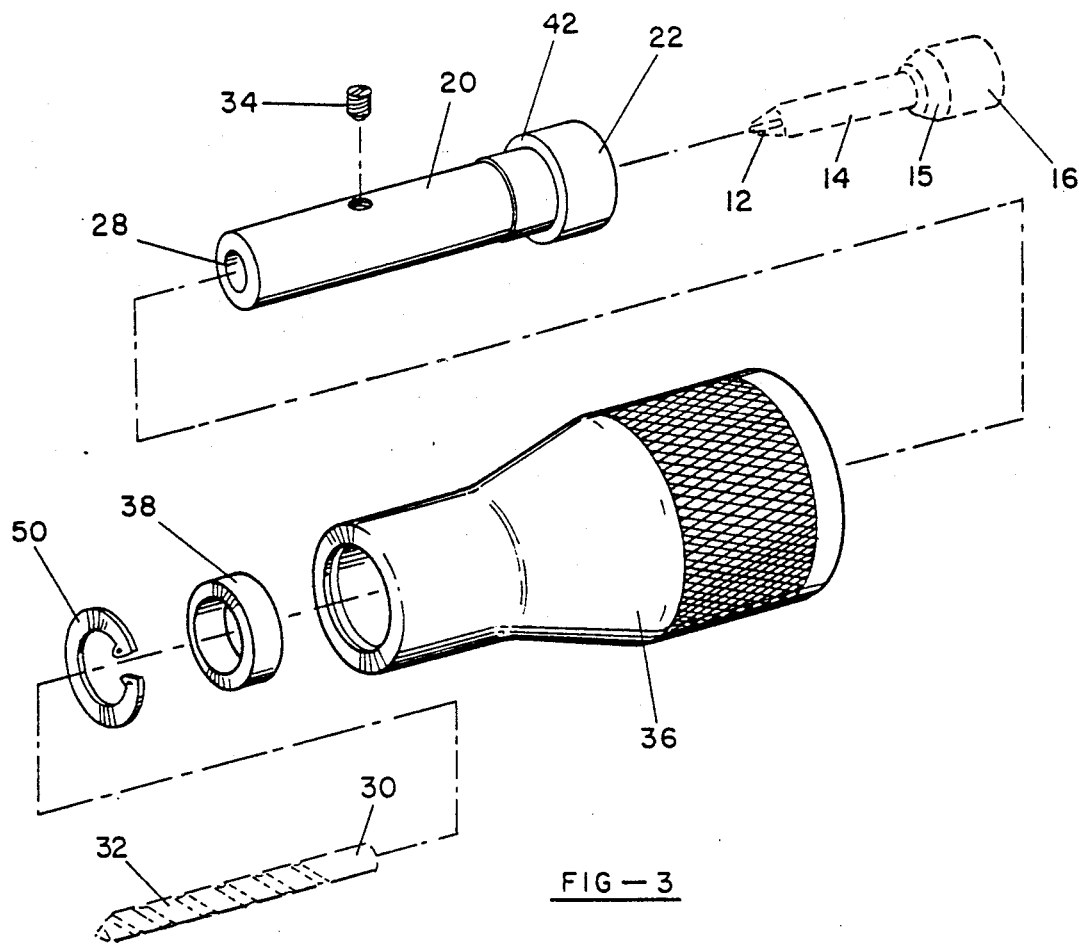
FIG—3
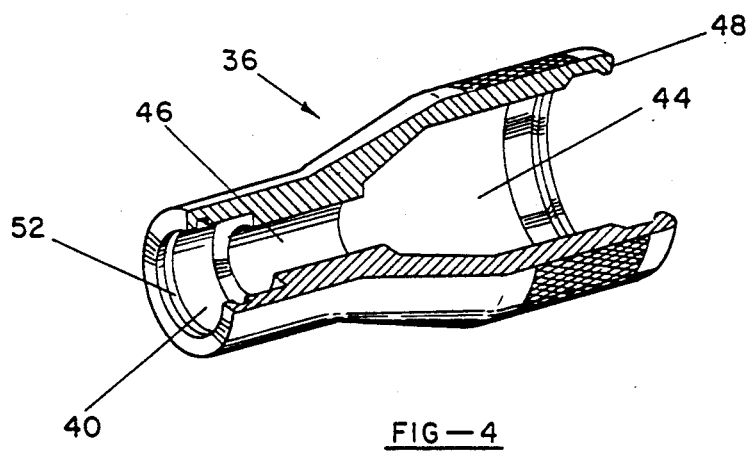
FIG—4
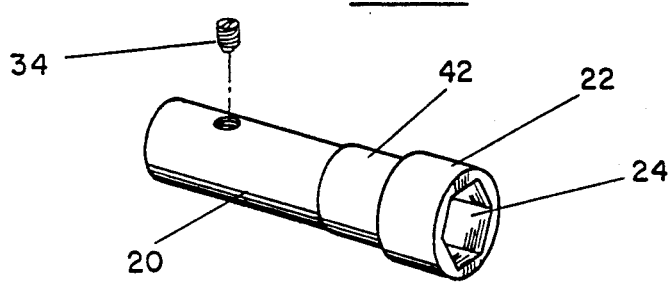
FIG—5

POWER TOOL ADAPTOR

BACKGROUND OF THE INVENTION

1. Field of the Invention (Technical Field)

The invention relates to a drill bit adaptor for a handheld power tool, such as an electric screwdriver.

2. Background Art

Many and varied are the attachments to hand-held power tools. U.S. Pat. No. 4,824,298, to Lippacher, et al., entitled Hand-Held Tool with Detachable Tool Bit Chuck, for example, teaches a comples "snap on" tool chuck retained by a spring-biased clamp member retained in openings on the original tool spindle.

U.S. Pat. No. 4,413,937, to Gutsche, entitled Elements for a Tool System, teaches a multi-pronged tool adaptor which fits into cavities between the chuck jaws, a tool, and the tool chuck body.

U.S. Pat. No. 4,944,641, to Alves, entitled Clutch Engager Sleeve, discloses a clutch engager which threadedly engages an attached drill chuck. A washer presses upon the clutch engager.

U.S. Pat. No. 3,973,784, to Smith, entitled Cutting Tool Adaptor, teaches a tool adaptor comprising a sleeve mounting a chuck at the forward end and engaging the shank of a tool at the rear end.

SUMMARY OF THE INVENTION (DISCLOSURE OF THE INVENTION)

The present invention is of an adaptor for a high speed power tool that mounts a polygonal shank configuration tool bit in a chuck and of an adaptor for converting a high speed screwdriver to a high speed drill.

The high speed power tool adaptor comprises: a torque transmitting sleeve comprising a polygonal cavity at one end for engaging the polygonal shank of the tool bit; a cylindrical cavity at the other end of the torque transmitting sleeve for releasably engaging a tool bit of cylindrical shank configuration; a screw or similar means for releasably attaching the tool bit of cylindrical shank configuration; and a grip sleeve mounted on the torque transmitting sleeve in relatively rotational relationship thereto, the grip sleeve enclosing and abutting the chuck of the power tool. In the preferred embodiment, the torque transmitting sleeve comprises a bearing seat intermediate the polygonal cavity and the cylindrical cavity. The polygonal cavity is counterbored to accommodate the tool bit jaws of the chuck of the power tool. The grip sleeve comprises a knurled outer surface, slots to improve resiliency of the grip sleeve or to provide resiliency for engaging the chuck of the power tool, and a lip for engaging the chuck. The grip sleeve is preferably made of aluminum, stainless steel, high-impact plastic, hard rubber, brass or bronze.

The high speed screwdriver adaptor comprises: a first sleeve comprising a first portion of a first predetermined outer diameter; a second portion of a second predetermined outer diameter less than the first portion predetermined outer diameter; and a third portion of a third predetermined outer diameter less than the first and second predetermined outer diameters. In the preferred embodiment, the adaptor further comprises: a second sleeve comprising a first portion of predetermined inner diameter; a second portion of a second predetermined inner diameter less than the first portion predetermined inner diameter; and a third portion of a third predetermined inner diameter greater than the second predetermined inner diameter. Preferably, the second sleeve is relatively rotationally mounted within the first sleeve. The first and second portion of the first sleeve further comprise a first cavity for engaging a first tool bit, the second portion of the first sleeve further comprises a bearing seat, and the third portion of the first sleeve comprises a second cavity for engaging a second tool bit. The first portion of predetermined inner diameter preferably engages a lock-down collar of the power tool, the second portion of predetermined inner diameter surrounds the first portion of the first sleeve, and the third portion of predetermined inner diameter further comprises a bearing seat.

An object of the invention is the provision of a quick connect-disconnect tool adaptor that is user-safe;

Another object of the invention is the provision of a tool adaptor that is inexpensive to manufacture;

An advantage of the invention is its ease of attachment to and detachment from a power tool;

Another advantage of the invention is its ease of assembly due to relatively few components.

Other objects, advantages, and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention.

FIG. 1 is a perspective view of the preferred embodiment of the invention in combination with a power tool.

FIG. 2 is an expanded cross-sectional view of the FIG. 1 embodiment.

FIG. 3 is a cutaway view of the preferred embodiment of the invention with a knurled grip sleeve.

FIG. 4 is a perspective cross-sectional view of the FIG. 3 grip sleeve.

FIG. 5 is a perspective view of the torque transmitting sleeve.

DESCRIPTION OF THE PREFERRED EMBODIMENTS (BEST MODE FOR CARRYING OUT THE INVENTION)

It frequently becomes necessary in the construction industry to quickly and safely convert a power tool from one function to another. For example, dry wall assembly frequently requires rapid conversion between power tool high speed drilling (e.g., metallic fixtures, such as sockets) and screwdriving capabilities. Such conversion should be quick, require a minimum of attachments and accessories, and, above all, provide safety to the user and those in the vicinity, in both conversion and use.

FIGS. 1-5 depict the preferred embodiment of the present invention. An electric screwdriver, comprising, for example, a Black and Decker Scrugun ® 10, or the like, having a high speed capability, typically of the order of 4000 rpm, is shown. The screwdriver further comprises a driver bit 12 having a hexagonal shank position 14; screw bit 12 is conventionally and detachably mounted in jaws 15 of chuck 16 for rotation therewith.

Adaptor 18 of the preferred embodiment of the invention basically comprises torque transmitting sleeve 20. Tool engaging end 22 of sleeve 20 further comprises deep hexagonal cavity 24 opening into conical cavity 26. Conical cavity 26 is of sufficient diameter to surround and engage jaws 15 of tool chuck 16.

The forward end of sleeve 20 comprises cavity 28 for accommodating cylindrical shank 30 of drill bit 32. In the preferred embodiment, drill bit 32 is secured to sleeve 20 by retaining screw 34. Obviously, various bit sizes can be accommodated as long as their shanks are of standard diameter (typically of the order of ¼" to ½"). Further, such bits may perform various functions, such as drilling, cutting, gouging, and the like. At the high speeds utilized, retaining screw 34 provides sufficient holding power to prevent relative rotation between shank 30 and sleeve 20, although other retention means can be used.

The preferred embodiment of the invention further comprises grip sleeve 36 mounted in concentrically and coaxially surrounding relationship to torque transmitting sleeve 20. Grip sleeve 36 provides user protection from rotating parts, and may also provide the user with a knurled gripping surface, as in FIG. 3, to both direct the drilling operation and to assure retention of torque transmitting sleeve 20 on screwdriver bit 12. Grip sleeve 36 may be slotted to afford a more resilient gripping cavity.

Grip sleeve 36 is mounted in relative rotational relationship to torque transmitting sleeve 20. Bearing races 38 are mounted between grip sleeve 36 and torque transmitting sleeve 20 in bearing seats 40 and 42, respectively. The bearings employed may be ball, roller or needle bearings, or any such bearings well known to those ordinarily skilled in the art.

Grip sleeve 36 also comprises cavity 44 leading to torque transmitting sleeve cavity 46. Cavity 44 is sufficiently large enough to totally encompass the chuck lock-down collar 16 of screw gun 10. Lip 48 guards against user hand access, further providing a safety feature. Torque transmitting sleeve 20 is positioned in cavity 46 in relative rotational relationship with grip sleeve 36 by virtue of bearings 38. Bearings 38 are secured by a retaining ring 50 positioned in groove 52.

Grip sleeve 36 may be fabricated from a variety of materials including, but not limited to, aluminum, high-impact plastic, hard rubber, bronze, brass and stainless steel. The only restriction upon materials is the requirement that grip sleeve 36 possess sufficient resiliency to "snap" on over a tool chuck. In furtherance of this requirement, grip sleeve 36 may be slotted, as at 37.

In operation, adaptor 18 is a snap fit over tool chuck 16 of screw gun 10; the hexagonal shank 14 of screw bit 12 engages a hexagonal cavity 24 in driving relationship. Lip 48 snaps over the lock-down collar 16 of the screw gun 10 chuck providing some retentive force, as well as user safety. After attachment of the proper size drilling bit to torque transmitting sleeve 20, the screw gun 10 and adaptor 18 are ready to undertake high speed drilling.

Upon completion of drilling, adaptor 18 is easily disengaged from the tool gun by merely pulling it off the gun in a forward direction.

Although the invention has been described with reference to these preferred embodiments, other embodiments can achieve the same results. Variations and modifications of the present invention will be obvious to those skilled in the art and it is intended to cover in the appended claims all such modifications and equivalents.

What is claimed is:

1. An adaptor for a high speed power tool, or the like, mounting tool bit means of polygonal shank configuration in chuck means, said adaptor comprising:

torque transmitting sleeve means comprising a polygonal cavity means at one end for engaging said polygonal shank of the tool bit means;

cylindrical cavity means at the other end of said torque transmitting sleeve means for releasably engaging a tool bit means of cylindrical shank configuration;

securing means for releasably attaching said tool bit means of cylindrical shank configuration;

grip sleeve means mounted on said torque transmitting sleeve means in relatively rotational relationship thereto; and said grip sleeve means enclosing a portion of said cylindrical cavity means and enclosing and abutting said chuck means of said power tool.

2. The invention of claim 1 wherein said torque transmitting sleeve means comprises bearing seat means intermediate said polygonal cavity means and said cylindrical cavity means.

3. The invention of claim 1 wherein said polygonal cavity is counterbored to accommodate tool bit jaws of the chuck means of the power tool.

4. The invention of claim 1 wherein said grip sleeve means comprises a knurled outer surface.

5. The invention of claim 1 wherein said grip sleeve means further comprises slots to improve resiliency to said grip sleeve means.

6. The invention of claim 1 wherein said grip sleeve means comprises lip means for engaging the chuck means of the power tool means.

7. The invention of claim 1 wherein said grip sleeve means is made of a material selected from the group consisting of aluminum, stainless steel, high-impact plastic, hard rubber, brass and bronze.

8. The invention of claim 1 wherein said grip sleeve means is slotted so as to provide resiliency for engaging said chuck means of said power tool means.

9. An adaptor for converting high speed screwdriver means to high speed drill means, comprising:

a first sleeve means comprising a first portion comprising a first predetermined outer diameter;

a second portion comprising a second predetermined outer diameter less than said first portion predetermined outer diameter; and a third portion comprising a third predetermined outer diameter less than said first and second predetermined outer diameters;

a second sleeve means comprising a first portion comprising a predetermined inner diameter;

a second portion comprising a second predetermined inner diameter less than said first portion predetermined inner diameter; and a third portion comprising a third predetermined inner diameter greater than said second predetermined inner diameter;

said first sleeve means being relatively rotationally mounted within said second sleeve means; and wherein said first portion of predetermined inner diameter engages lock-down collar means of power tool means.

10. The invention of claim 9 wherein said second portion comprising a second predetermined inner diameter of said second sleeve means surrounds said first portion of said first sleeve means.

11. The invention of claim 9 wherein said third portion comprising a third predetermined inner diameter further comprises bearing seat means.

12. The invention of claim 9 wherein said first and second portion of said first sleeve means further comprise first cavity means for engaging first tool bit means.

13. The invention of claim 9 wherein said second portion of said first sleeve means further comprises bearing seat means.

14. The invention of claim 9 wherein said third portion of said first sleeve means comprises second cavity means for engaging second tool bit means.

* * * * *